United States Patent [19]

Sing

[11] Patent Number: 4,754,602
[45] Date of Patent: Jul. 5, 1988

[54] INTERNAL COMBUSTION PROPULSION ENGINE

[76] Inventor: Peter Sing, 168-10 84th Ave., Jamaica Hill, N.Y. 11432

[21] Appl. No.: 883,100

[22] Filed: Jul. 8, 1986

[51] Int. Cl.$^4$ .......................... F02K 1/00; F02K 1/54
[52] U.S. Cl. ........................................ 60/228; 60/232; 60/271; 239/265.19; 74/479
[58] Field of Search ............... 60/228, 230, 232, 242, 60/271; 239/265.19, 280.5, 587, 569; 74/479, 471 XY; 251/339

[56] References Cited

U.S. PATENT DOCUMENTS

| | | | |
|---|---|---|---|
| 1,926,095 | 9/1933 | Graves | 251/339 |
| 3,031,166 | 4/1962 | Fischer | 251/339 |
| 3,050,938 | 8/1962 | Twyford | 239/587 |
| 3,107,488 | 10/1963 | Strauss et al. | 60/228 |
| 3,132,479 | 5/1964 | Kuhn, Jr. | 60/232 |
| 3,192,714 | 7/1965 | Hickerson | 60/230 |
| 3,726,480 | 4/1973 | Miltenberger | 60/232 |
| 3,842,689 | 10/1974 | Bagge | 74/479 |
| 3,848,806 | 11/1974 | Samuelson et al. | 60/742 |
| 4,320,891 | 3/1982 | Cairns | 251/339 |
| 4,360,160 | 11/1982 | Jette | 239/587 |
| 4,621,581 | 11/1986 | Kurimoto | 74/479 |

FOREIGN PATENT DOCUMENTS

| | | | |
|---|---|---|---|
| 13155 | 12/1970 | Japan | 74/479 |
| 138237 | 10/1979 | Japan | 74/471 XY |
| 1605006 | 12/1981 | United Kingdom | 60/232 |

Primary Examiner—Louis J. Casaregola
Assistant Examiner—Donald E. Stout
Attorney, Agent, or Firm—Nathaniel Altman

[57] ABSTRACT

An internal combustion propulsion engine comprises a spherical engine body having radially projecting exhaust nozzle extending from its surface. The spherical engine body is adjustably supported in a complementarily mating socket for unrestricted positioning of the body, for selectively directing the flow of combustion gases emanating from the exhaust nozzle and thus channeling the direction of thrust generated thereby as required. A convergently conical valve member is mounted on the rod of a piston cylinder coaxially with the corresponding divergently conical opening of the exhaust nozzle, the valve member being positioned adjustably projecting into the outlet end of the complementarily mating exhaust opening in direct confrontation with the combustion gases flowing therefrom. Means for positioning the valve member to regulate the distance between valve member and exhaust opening walls are provided to adjust selectively the rate of exhaust flow and thus the magnitude of thrust force developed.

4 Claims, 1 Drawing Sheet

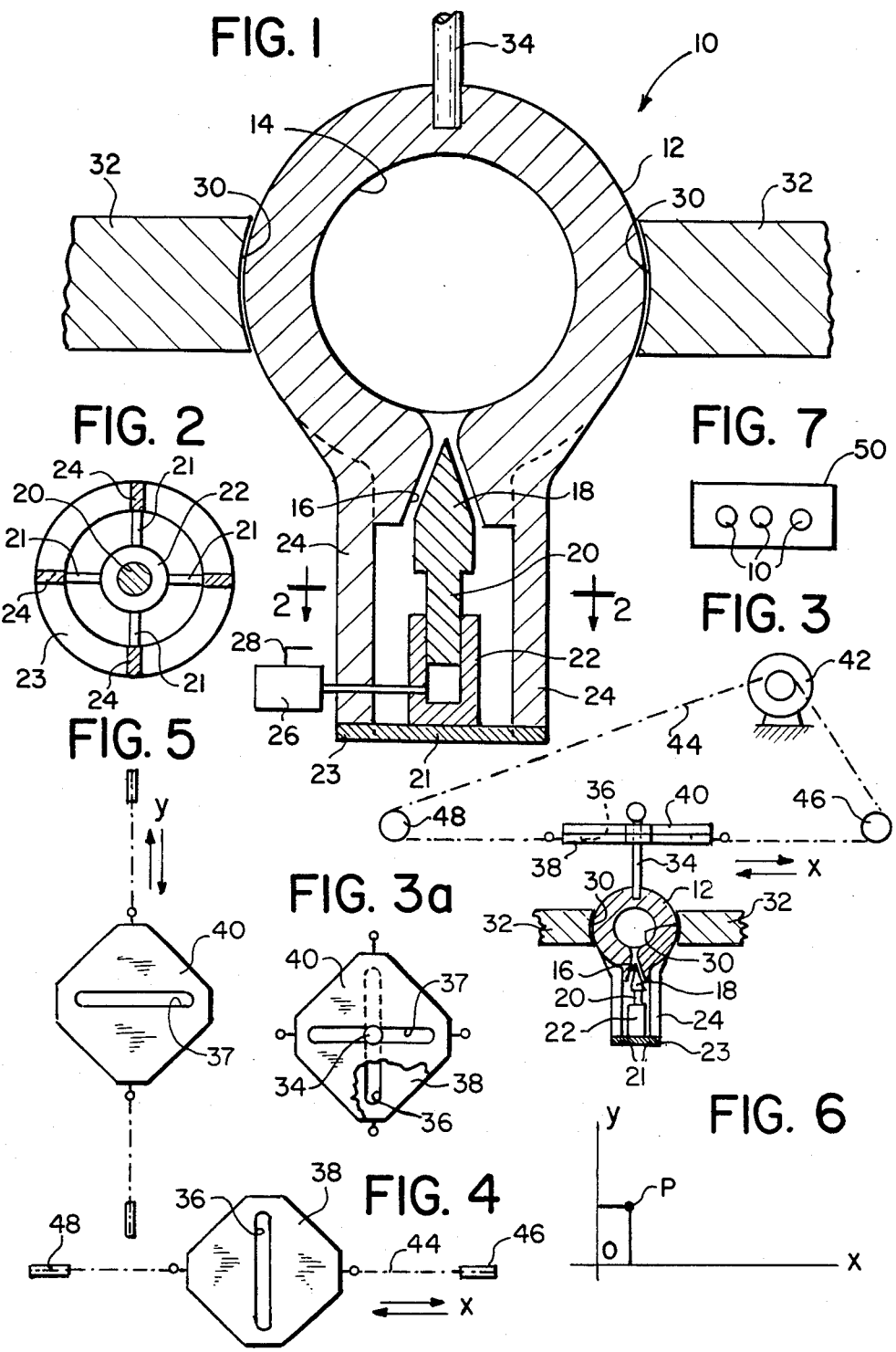

INTERNAL COMBUSTION PROPULSION ENGINE

FIELD OF THE INVENTION

This invention relates to internal combustion engines, and more particularly to jet engines in which rearwardly escaping gases cause forward thrust.

DESCRIPTION OF THE PRIOR ART

Jet engines are known in which the direction of movement is controlled by steering devices on the vehicle driven by the engine. It is also known to control the forward thrust, or speed, of such vehicle by controlling the amount of fuel and/or oxygen supplied to the engine.

OBJECTS OF THE INVENTION

The main object of this invention is to provide means for controlling the direction and speed of a vehicle, which involves the jet engine itself, that propels such vehicle.

Another object of the invention is to provide a jet engine comprising a universally mounted jet engine having an exhaust port, whereby the direction of the exhaust gas from such port is used to control the direction of thrust and the corresponding direction of movement of such engine, as well as that of a vehicle driven by the engine.

A further object is to provide a jet engine in which the force and/or speed of thrust is controlled by the relative closing pressure applied to an exhaust port valve of the engine.

A still further object is to provide a vehicle with a plurality of novel jet engines that can be controlled in direction and force of thrust, individually as well as all together.

SUMMARY OF THE INVENTION

A jet engine is provided with mounting on a vehicle to be propelled, comprising a univeral joint, so that the backward exhaust of the engine can be directed to control the direction of forward movement of the vehicle. Several of such engines are mounted on a vehicle for operation together or individually as required by the nature of the vehicle.

The engine comprises a globular body, or ball, having an internal combustion chamber, and a funnel shaped exhaust opening in which a pointed valve extends for controlling the exhaust. A cylinder is mounted on the body, which faces in the direction of such exhaust and carries such valve. The piston is biased by spring or hydraulic means toward closure of said valve in said opening or exhaust port.

BRIEF DESCRIPTION OF THE DRAWINGS

The invention will now be described further, by way of example, with reference to the accompanying drawings, in which FIG. 1 is a view mainly in vertical cross section, and partly in elevation of an internal combustion propulsion engine illustrative of the invention;

FIG. 2 is a view in cross section of the propulsion engine and its universal mount taken on line 2—2 of FIG. 1;

FIG. 3 is a view of the propulsion engine in cross section together with a schematic view of its universal joint mount directional control system;

FIG. 3a is a plan view partially broken away of the directional control means of FIG. 3;

FIGS. 4 and 5 are plan views of the bi-directional control means associated with the engine;

FIG. 6 is graph of the resultant movement of the engine under such bi-directional control; and FIG. 7 is a view in front elevation of a plurality of engines carried by a vehicle the direction and speed of which is controlled by such engines.

DESCRIPTION OF THE PREFERRED EMBODIMENT

A jet engine 10 comprises a globular body or ball 12 contains an internal combustion chamber 14 having a projecting exhaust port with an, opening or outlet 16 that is in the shape of a funnel. Extending into the exhaust port 16 is a tapered valve 18 provided with a piston 20. The piston 20 is carried by a cylinder 22 facing the valve 18 and port 16. The cylinder 22 is, in turn, mounted spaced from the ball of the engine body 12 by cross base members 21, 21 extending radially to annular ring 23 ,which is connected and supported on to the body 12 by four struts 24.

The cylinder 22 is connected to a source 26 of hydraulic fluid under pressure, provided with a throttle 28 for controlling the piston 20 to regulate the position of the valve 18 with respect to the exhaust port 16. Other biasing means for controlling the piston 20—valve 18, including spring means, may be used in place of hydraulic means.

The ball shaped body 12 of the combustion chamber 14 is mounted to swivel in a socket 30 provided by an engine support 32, 32 for universal rotary movement therein for the purpose of directing the engine exhaust as desired. For so directing the engine exhaust from port 16, a radial pin 34 is connected to the globular body 12 of the engine. Such pin extends through crossed slots 36 and 37 in parallel plates 38 and 40, the movement of which is controlled by reversible motors, one 42 of which is shown, FIG. 3. The motor 42 drives plate 38, for example, by means including a belt 44 carried by spaced pulleys 46 and 48. The upper plate 40 is similarly controlled, so that the resultant position P of pin 34, FIG. 6, is effected by selective relative movements x and y of the plates 38 and 40. Thus, the engine body 12 is swivelled in the universal joint provided by such ball shaped body 12 and socket 30 of engine support 32.

The support 32 may be part of a vehicle 50, FIG. 7, to be propelled by the engine 10, several of which are shown in case more than one engine 10 is used. The vehicle 50 may be a space ship, aircraft, or any other suitable type of vehicle, including the engine itself.

Any suitable fuel or fuels may be supplied to the combustion chamber 14 of the engine, where it is ignited and the products of combustion are exhausted from port 16 under control of valve 12. Also remote and/or computers may be used to control the engine.

While the invention has been described by reference to a particular embodiment, it will be clear to those skilled in the art that various modifications may be made without departing from the spirit and scope of the invention as set forth in the appended claims.

I claim:

1. An internal combustion propulsion engine comprising:

a spherical engine body having an internal combustion chamber, said engine body being provided with a radially projecting nozzle which has an outwardly divergent conical exhaust opening centrally disposed therein, said nozzle being an extension in the wall of said engine body;

a plurality of spaced support struts attached to and outwardly projecting from said spherical engine body parallel to the central axis of said exhaust opening in said nozzle;

a planar annular ring carried by said plurality of support struts, said annular ring being fixedly spaced from said projecting nozzle and being positioned so that its plane is orthogonal to said central axis of said conical exhaust opening;

a plurality of cross-rib members attached to, extending radially inwardly from, and coplanar with, said annular ring, said cross-rib members being joined at the center of said annular ring;

a piston cylinder fixedly mounted centrally on said plurality of cross-rib members coaxially with and facing said exhaust opening in spaced relation thereto;

a valve member convergently conical at its free end extending from and supported on said piston cylinder, said valve member being coaxial with, confrontationally projecting into the outlet end of, and correspondingly tapered to mate with, said exhaust opening in said nozzle, said piston cylinder and said valve member being aligned with and directly facing said nozzle exhaust opening and the exhaust combustion gases emerging therefrom;

means operatively associated with said piston cylinder for variably positioning said valve member with respect to said exhaust opening to control adjustably the space between the walls of said exhaust opening and said matchedly tapered valve member, thereby establishing the flow rate of exhaust combustion gases emanating from said exhaust opening and the propulsive thrust thereof; and frame support means for permitting universal movement of said spherical engine body, said support means comprising a spherical socket matingly complementary to and movably containing said spherical engine body for unrestricted positioning therein to control the direction of thrust of said exhaust combustion gases as desired.

2. An internal combustion propulsion engine as defined by claim 1, wherein said means for variably positioning said valve member with respect to said exhaust opening comprises:

means connecting said piston cylinder to a source of fluid under pressure; and throttle means for regulating adjustably the fluid pressure applied to said piston cylinder from said source of fluid under pressure through said connecting means, and, by thus positioning said valve member, controlling the rate of exhaust combustion gases emanating from said exhaust opening, thereby adjustably setting the thrust force produced.

3. An internal combustion propulsion engine as defined by claim 1, further comprising means for positioning said spherical engine body in said spherical socket in said frame support means, so that the engine exhaust combustion gas flow is directed as desired to control the direction of the thrust provided by the internal combustion propulsion engine.

4. An internal combustion propulsion engine, as defined by claim 3, in which said engine positioning means comprises:

a pin fixedly mounted on said spherical engine body, said pin extending radially outwardly from the surface of said engine body;

a pair of parallel superimposed plates laterally movable relative to each other, each of said plates having an elongate slot, said slots being disposed at right angles to each other and having said pin extending therethrough and thus said pin and said engine body capable of being positioned by the movement of said plates; and means for controlling the relative movements of said plates with respect to each other to adjust the position of said pin and thereby the position of said spherical engine body in said spherical socket, so that the thrust from the flow of exhaust combustion gases is directed as desired.

* * * * *